United States Patent
Byron et al.

(10) Patent No.: US 11,475,485 B2
(45) Date of Patent: Oct. 18, 2022

(54) AUTOMATED CURATION OF DIGITAL INFORMATION AND USER INTERFACE FOR SAME

(71) Applicant: International Business Machines Corporation, Armonk, NY (US)

(72) Inventors: Donna K. Byron, Petersham, MA (US); Edward E. Seabolt, Williamson, TX (US); Mary D. Swift, Rochester, NY (US); Brian Hull, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 16/026,117

(22) Filed: Jul. 3, 2018

(65) Prior Publication Data

US 2020/0013091 A1  Jan. 9, 2020

(51) Int. Cl.
*G06Q 30/00* (2012.01)
*G06Q 30/02* (2012.01)
*G06Q 30/06* (2012.01)
*G06F 40/30* (2020.01)
*G06V 30/413* (2022.01)

(52) U.S. Cl.
CPC ......... *G06Q 30/0271* (2013.01); *G06F 40/30* (2020.01); *G06Q 30/0276* (2013.01); *G06Q 30/0277* (2013.01); *G06Q 30/0643* (2013.01); *G06V 30/413* (2022.01)

(58) Field of Classification Search
None
See application file for complete search history.

(56) References Cited

U.S. PATENT DOCUMENTS

| | | |
|---|---|---|
| 5,721,902 A | 2/1998 | Schultz |
| 9,071,728 B2 | 6/2015 | Begeja |
| 9,319,359 B1* | 4/2016 | Srivastava ............ G06Q 10/10 |
| 9,378,203 B2 | 6/2016 | Sweeney |
| 2012/0139940 A1 | 6/2012 | Chavanne |
| 2014/0237533 A1 | 8/2014 | Cabasse |
| 2014/0337321 A1* | 11/2014 | Coyote ................. G06F 3/0482 707/722 |
| 2016/0307071 A1* | 10/2016 | Perronnin ................ G06K 9/66 |

(Continued)

FOREIGN PATENT DOCUMENTS

CN         105868185        8/2016

OTHER PUBLICATIONS

Peter Mell, "The NIST Definition of Cloud Computing," Special Publication 800-145; Sep. 2011; pp. 1-7.

(Continued)

*Primary Examiner* — Michael W Schmucker
(74) *Attorney, Agent, or Firm* — Brian Welle; Otterstedt & Kammer PLLC

(57) ABSTRACT

A method of configuring a widget defining a user interface includes parsing content from a corpus comprising documents describing a plurality of products, selecting a plurality of pillars from the content, wherein the pillars are descriptors describing a product space of the products, determining an affinity of each of the products to each of the pillars, receiving, via the widget, a selection of a first pillar, and displaying a given product in the widget, the given product selected from the products given the selection of the first pillar.

8 Claims, 9 Drawing Sheets

(56) References Cited

U.S. PATENT DOCUMENTS

| | | |
|---|---|---|
| 2017/0024385 A1 | 1/2017 | Drake |
| 2018/0089191 A1* | 3/2018 | Obasanjo ............ G06Q 30/0277 |
| 2019/0080207 A1* | 3/2019 | Chang .................... G06K 9/723 |
| 2019/0095960 A1* | 3/2019 | Byron ................ G06Q 30/0277 |
| 2019/0311214 A1* | 10/2019 | Lakemond ........... G06K 9/6215 |

OTHER PUBLICATIONS

Vasileios Hatzivassiloglou et al., "Effects of Adjective Orientation and Gradability on Sentence Subjectivity," Proceedings of the 18th conference on Computational linguistics—vol. 1, Jul. 31, 2000, pp. 299-305.

Vasileios Hatzivassiloglou et al., "Towards the Automatic Identification of Adjectival Scales: Clustering Adjectives According to Meaning" Proceedings of the 31st annual meeting on Association for Computational Linguistics, Jun. 22, 1993, pp. 172-182.

Daniel Jurafsky et al., "Speech and Language Processing," Chapter 14, Dependency Parsing, Aug. 28, 2017, pp. 1-27.

Shi Zhang et al., "Language and culture: linguistic effects on consumer behavior in international marketing research," in the Handbook of Research in International Marketing, Sep. 26, 2003, pp. 228-242.

\* cited by examiner

AUTOMATED CURATION OF DIGITAL INFORMATION AND USER INTERFACE FOR SAME

The present disclosure relates generally to automated creation of digital information and to a user interface for the same, and more particularly to methods for automatically generating digital information from a corpus of product based materials.

Digital advertising, for example, advertising presented across websites, mobile applications and social platforms, enables advertisers to reach and appeal to customers with flexibility and precision.

BRIEF SUMMARY

According to an embodiment of the present invention, a graphical user interface tool includes a displayed product selected from a plurality of products, a plurality of elements displaying respective selectable pillars, wherein the pillars are descriptors describing a product space of the products, and a control element, configurable by a user, for selecting one or more of the pillars, wherein the displayed product is updated by selecting another product from the products based on a configuration of the control element.

According to an embodiment of the present invention, a method of configuring a widget defining a user interface of a cognitive ad includes parsing content from a corpus comprising documents describing a plurality of products, selecting a plurality of pillars from the content, wherein the pillars are descriptors describing a product space of the products, determining an affinity of each of the products to each of the pillars, receiving, via the widget, a selection of a first pillar, and displaying a given product in the widget, the given product selected from the products given the selection of the first pillar.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention provide substantial beneficial technical effects. For example, one or more embodiments may provide for automated curation of digital information and a user interface for same with one or more of the following advantages:

Efficient deployment of user experiences, and

Dynamic discovery of features or tags related to a product.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
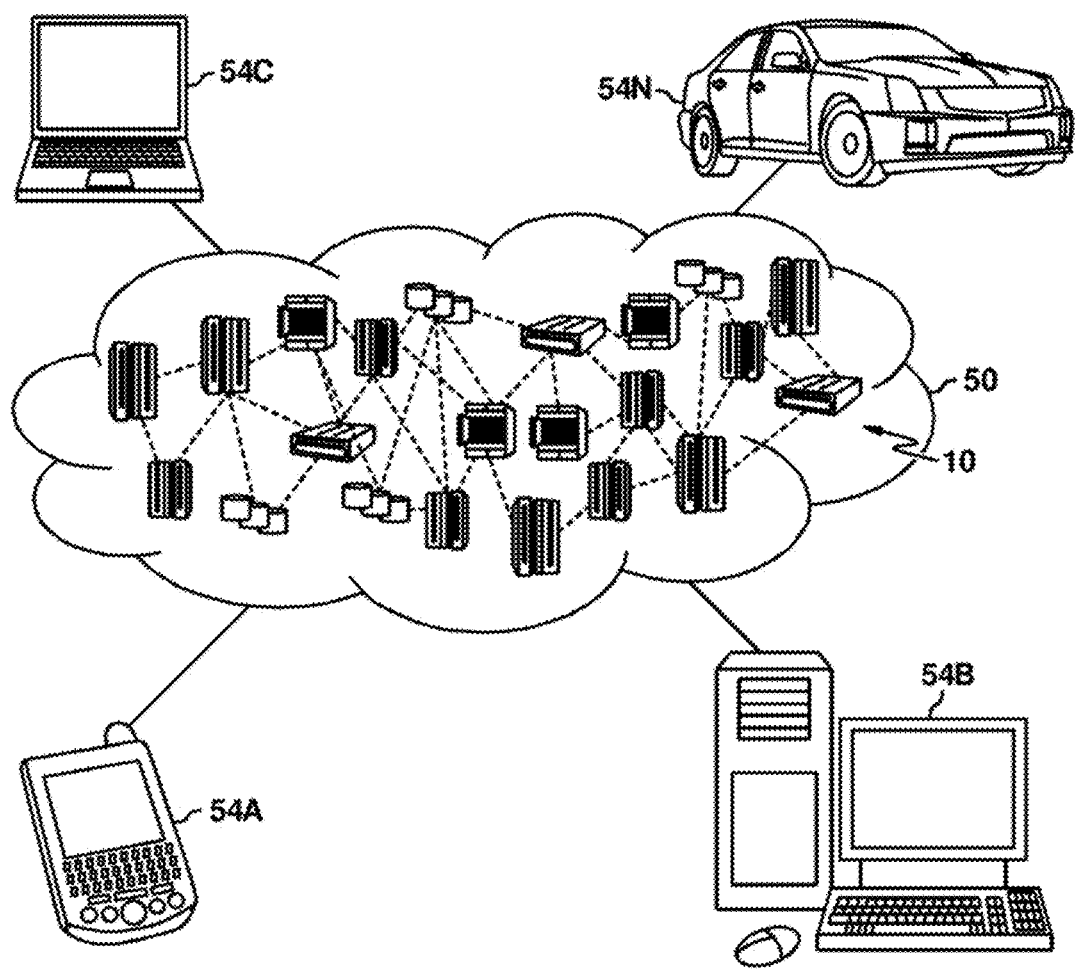
FIG. 1 depicts a cloud computing environment according to an embodiment of the present invention.

One or more embodiments of the present invention are related to a tool for computer based automated creation of cognitive ad experiences, and more particularly to a User Interface (UI) portraying products related to searchable product attributes, where the product attributes are consistent across product industry categories and domains.

According to an exemplary embodiment of the present invention, a corpus is processed to discover descriptors related to a product or a range of given products described therein, where the descriptors are automatically and dynamically implemented within a widget to generate a nonconventional advertisement ("ad"), and more particularly, a cognitive ad. For example, according to at least one embodiment of the present invention, dimensions or pillars are derived from descriptors (e.g., adjectives) present in the corpus to represent certain product concepts. Each of the pillars displayed in the UI can be interactively manipulated to discover product variations, or different products, described in the corpus according to the manipulated pillar dimension.

It should be understood that the term widget is used herein to describe a tool for generating a cognitive ad, and also, once generated, to describe the cognitive ad facing the end user or customer. That is, the widget can be a tool for generating the cognitive ad and the interactive ad interface itself, referred to herein after as the cognitive ad. Stated simply, the widget is useful to both a builder of the ad and the end user of the ad.

According to an exemplary embodiment of the present invention, cognitive ads provide interactive product promotion/exploration experiences for consumers on digital media at increased velocity as compared to other techniques. The velocity of the cognitive ad refers to the time needed develop and deploy the ad, for example, including the time need to make a decision about a product to be advertised. According to an embodiment of the present invention, the widget enables the construction of ad content directly from an existing corpus of product material, which is a non-conventional technological improvement over a copy-editor manually organizing and condensing material. It should be understood that the concept of velocity is vital to revenue generation, where the widget according to an embodiment of the present invention can speed the velocity of deployment of the cognitive ad facing the end user.

According to one or more embodiments of the present invention, the widget is an interactive computer user interface element active on any type of presentation mechanism. For example, the widget can be provided on a touch-sensitive display screen of a kiosk, through an advertisement within a public setting such as on a seat-back screen of a public conveyance, such as a taxi or airplane, on the user's own mobile device in an app, or within a web browser of a computer. Additional exemplary embodiments include virtual reality ("VR") or augmented reality displays that allow user to navigate or browse information using the motion of a user's body or head, eye-tracking, hand-based controls and/or mouse, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
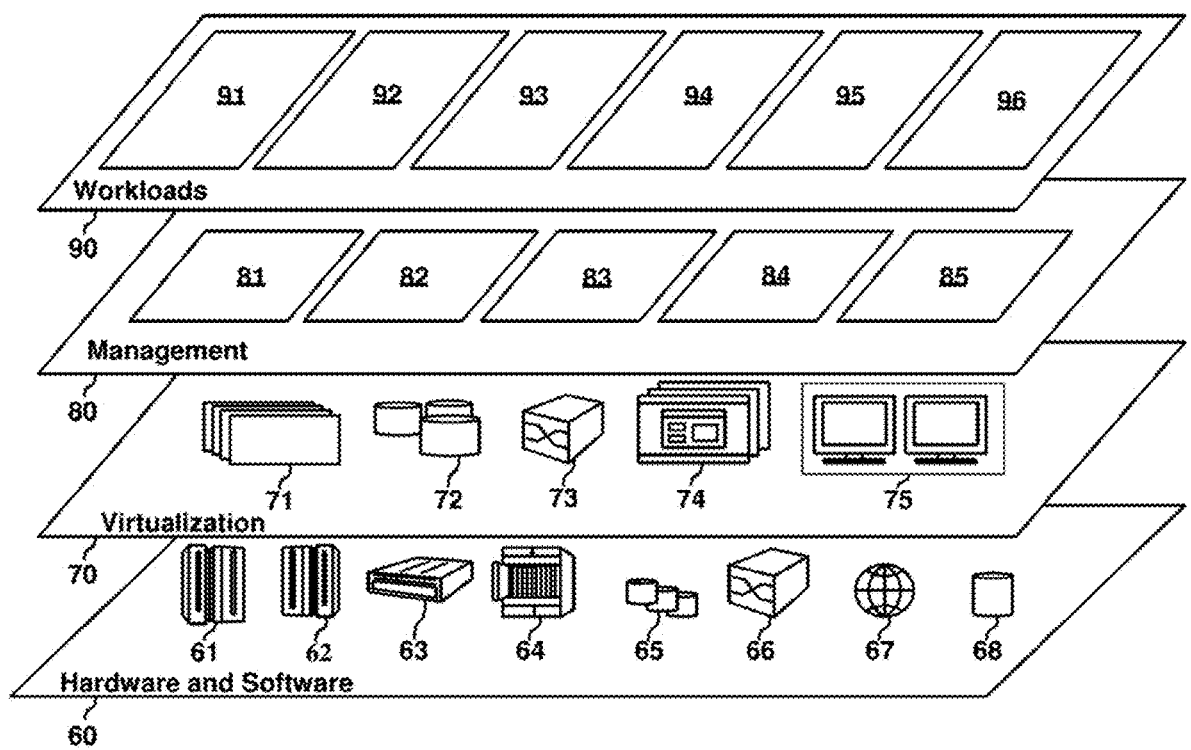
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated creation of cognitive ad experiences 96.

As described herein, UI elements within a running application (e.g., visible in the context of the application) including buttons, sheets, controls, text boxes, containers, etc., and are referred to as widgets for the remainder to the present disclosure. These UI elements are not intended to be limiting, and other UI elements, now known and yet to be developed, are to be considered widgets in the context of this disclosure.

Figure 3:
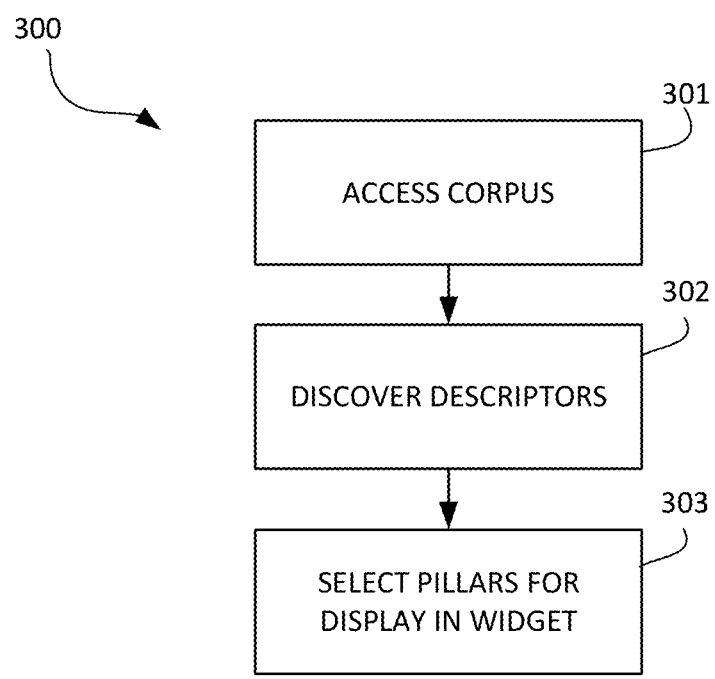
FIG. 3 depicts a method for automated creation of cognitive ad experiences according to an embodiment of the present invention.

Referring to FIG. 3, in a method for automated creation of cognitive ad experiences 300, a corpus comprising documents describing one or more products (such as a print advertisement, company-internal product literature, customer reviews flyer, electronic presentation, etc.) is accessed 301 and automatically parsed 302 for content including keywords, images, concepts, etc. This content comprises descriptors of the product(s). The method further includes selecting N pillars 303 from the discovered descriptors. The pillars are displayed in a widget, where the widget is a particular user interface element. The N pillars are automatically selected from the descriptors parsed from the corpus. In at least one embodiment, the N pillars are automatically selected given an input from end user, for example, through the manipulation of a given UI element (e.g., see FIG. 8).

According to an exemplary embodiment of the present invention, the corpus at block 301 is a domain-specific corpus. In at least one exemplary embodiment the corpus includes an indication of a plurality products of interest (e.g., a provided set of product names), to be loaded into the widget. According to at least one embodiment of the present invention, the provided set of product names includes products previously identified as being relevant to a particular end user (e.g., using HTTP cookies or social media), seasonally-relevant products, etc. According to one or more exemplary embodiments of the present invention, one or more products of interest are determined from the corpus. Products of interest determined from the corpus can be added to the provided set of product names or can form the totality of the products of interest, such as in a case where no indication of the products of interest is provided with the corpus.

Referring again to block 301 and according to at least one embodiment of the present invention, accessing the corpus (e.g., a product catalog or other domain-specific corpus) includes accessing a remote or local stored information.

According to at least one embodiment of the present invention, descriptors are discovered 302 by content parsing. The content parsing is performed using one or more known parser technologies, including natural language parsing (NLP) methods for parsing text appearing in the corpus (or in a plurality of document vectors created from the corpus as described herein), image parsing using visual recognition methods including deep learning algorithms to identify scenes, objects, and faces in images (e.g., including the identification of items in an image in the input document(s), such as "cup," "ceramic," "coffee," etc.), and other parsing techniques.

Figure 4:
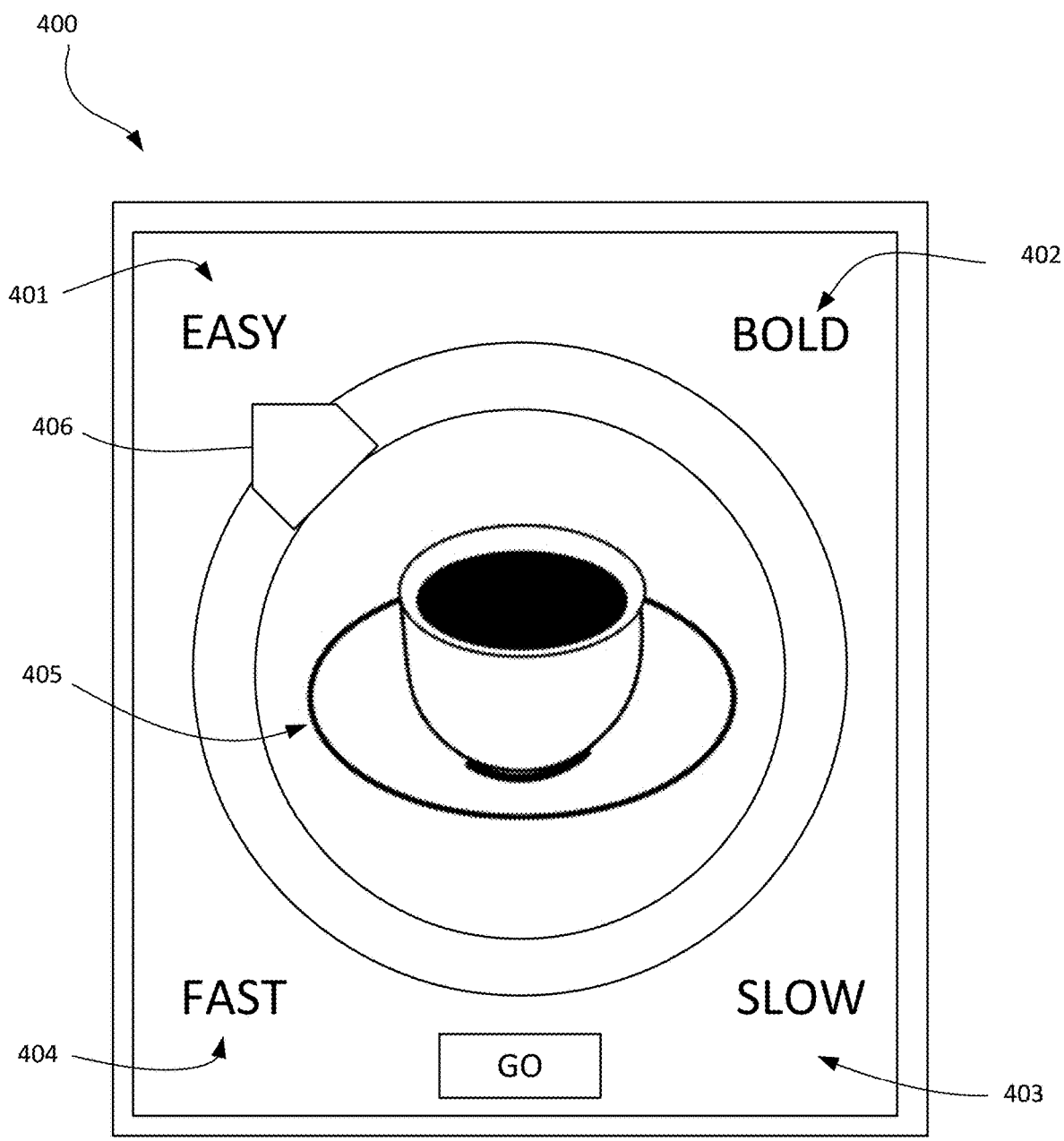
FIG. 4 depicts an exemplary widget for automating the creation of a cognitive ad experience according to an embodiment of the present invention.

In at least one exemplary embodiment, at block 303, the number of selected pillar descriptors, N, is selected based on one or more constraints of a cognitive ad. In the example shown in FIG. 4, the widget 400 displays four corner positions (401-404) for selected pillar descriptors (i.e., N=4). Here, it should be understood that the method receives one or more constraints on the cognitive ad, including available colors (e.g., the available color gamut of a presentation medium available to the cognitive ad), the layout of the cognitive ad (e.g., a size of a space available for the cognitive ad), etc. In at least one embodiment of the present invention, these constraints are respected by the widget during development of the cognitive ad, such that the widget can be deployed (e.g., to an end user's device, or to an intermediary, such as webserver) as a cognitive ad without modification.

According to at least one embodiment of the present invention, the selected pillars maximize a factor, such as arranging a maximum number of products in a given space for the cognitive ad.

It should be understood that embodiments of the present invention are not limited to providing a UI for browsing products, and that the widget is suitable to display data related to other classes including services, destinations, etc. As used herein, the term product should be understood to be inclusive of these other classes.

Figure 5:
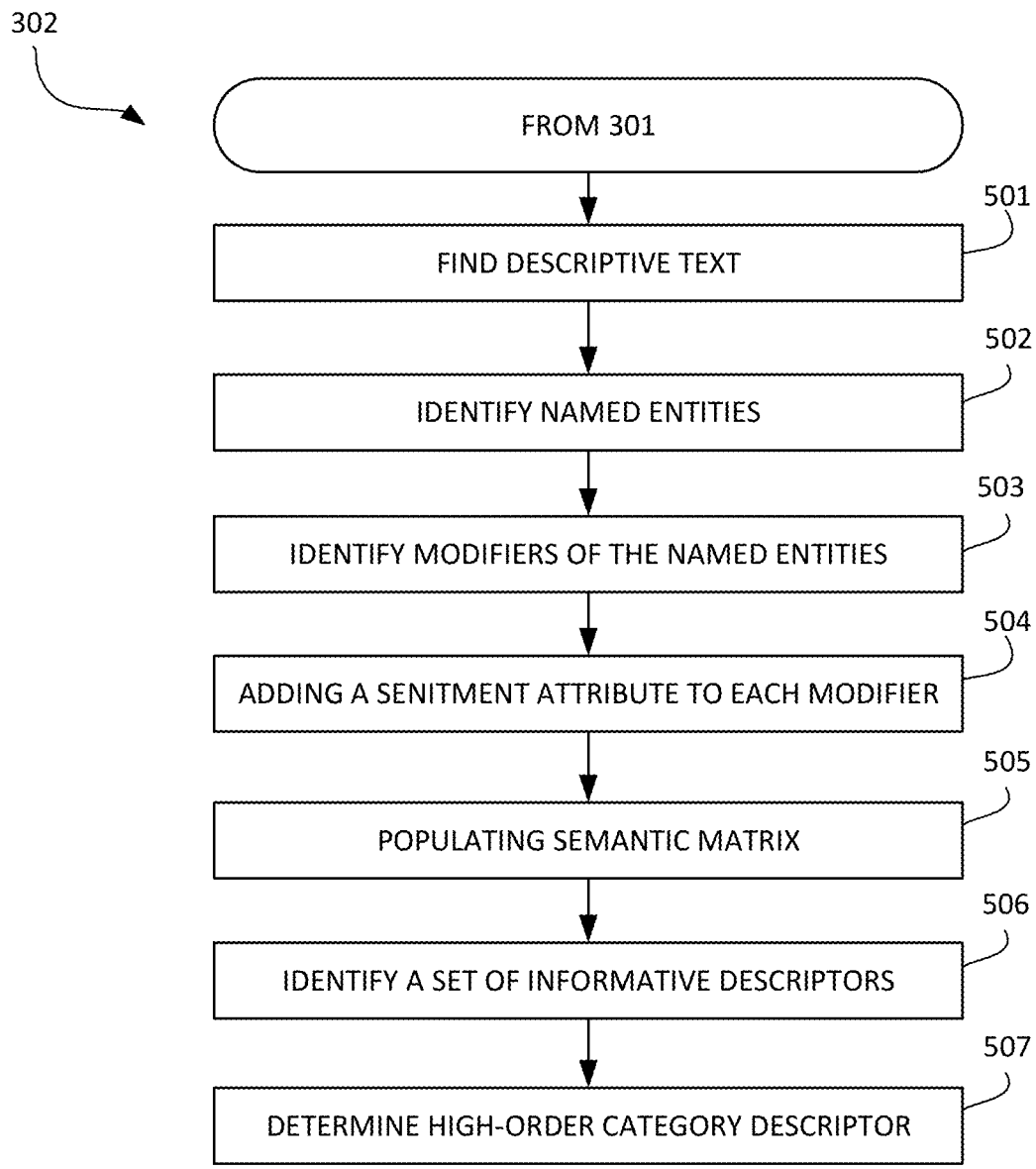
FIG. 5 depicts a method for discovering descriptors according to an exemplary embodiment of the present invention.

According to an embodiment of the present invention and referring to FIG. 5, a method of discovering the descriptors 302 includes finding descriptive text that is potentially related to products of interest in the corpus 501. Hereinafter, the products of interest are referred to as named entities. The method further includes parsing the text found at block 501 to identify one or more named entities of interest 502, identifying modifiers of the named entities of interest 503 and adding a sentiment attribute to one or more of the modifiers 504. The method further comprises creating a semantic matrix (see for example, Semantic Matrix 1 below) with cells populated with a count of modifier frequency for each document vector or named entity 505 and identifying, using the semantic matrix, a set of descriptors representing each document vector or named entity 506.

According to at least one embodiment of the present invention, block 502 includes finding named entities not previously provided in the corpus 502. Again, any provided products of interest are named entities for purpose of the following disclosure. Further, at block 502, a vector space semantic model is created 502 for the named entities (i.e., the provided products of interest and/or identified named entities).

According to at least one embodiment of the present invention, the modifiers of each named entity are stored in a separate document vector at 503. It should be understood that, as used herein, document vectors and named entities (i.e., products) are essentially equivalent, where a document vector is constructed for each named entity. The method gathers a descriptor set for each named entity, and the descriptor set is the constructed document vector. Document vectors enable vector-space semantic distance calculations, etc.

More particularly, at block 503, for each product of interest, the method constructs a document vector including text, images, and/or sounds (e.g., represented and linked to clickable icons in the UI) found in the corpus that relates to a given product. The document vector (D) is stored in a vector space semantic model, where columns of the semantic matrix relate to individual document vectors.

| Semantic Matrix 1: | | | |
|---|---|---|---|
| | D1 | D2 | D3 |
| DESCRIPTOR1 | 0 | 2 | 1 |
| DESCRIPTOR2 | 5 | 3 | 9 |
| DESCRIPTOR3 | 1 | 2 | 5 |
| IMAGE1 | 1 | 1 | 1 |

According to at least one embodiment of the present invention, in a case where no document vectors are created (optionally), the top row of the exemplary Semantic Matrix 1 is populated by product names (i.e., replacing "D1," etc.). That is the product or document vector can be used for the columns in the semantic matrix.

As described herein, the method of decomposing a corpus of documents into a vector space representation uses one or more standard processes in text processing. These vector space representations can be used to compare the underlying documents. For example, the use of two particular words can be compared, wherein given the two words, a comparison of their respective vectors in the positional array can be used to calculate a similarity of the words.

Referring again to block 503, the method includes parsing the found descriptive text, including for example, product webpages, online reviews, company blogposts, etc., to identify instances of the named entities of interest. According to at least one exemplary embodiment of the present invention, the parsing is performed using known natural language processing methods, for example, as performed using the Watson Discovery service.

Referring again to block 503, the method includes identifying modifiers, such as adjective words or phrases, that relate to the named entities or their repeated anaphoric mentions, such as pronouns. According to at least one embodiment, the method of identifying modifiers includes searching for dependency trees (described herein) rooted at the named entity level, for example, a dependency tree rooted in an identified product name. For example, once mentions of the named entities have been found in a dependency tree, the method includes a search for modifiers of the named entities, such as "stylish" appearing in the same dependency tree (e.g., branch). In this way the search avoids oblique references that are also descriptors, such as, "available in southern Wyoming." The identification of modifiers results in a list of captured descriptors for each product or named entity. The list of descriptors for the entire corpus becomes a vocabulary, which is populated in the rows in the semantic matrix. One or ordinary skill in the art would appreciate that, the descriptors can be loaded directly into the semantic matrix, without generating the document vectors.

Referring to the dependency trees, using an available syntactic parser, such that available from Stanford NLP lab or BLLIP from Brown University, natural language sentences are analyzed for logical relationships and a dependency tree is output. Arcs in the dependency tree link modifier words, such as adjectives and adverbs, to the entities they modify, such as nouns or event verbs. The arcs can show additional information, such as the argument structure such as identifying a main subject of a sentence. According to at least one exemplary embodiment, the plain text from source documents available in the corpus is parsed to obtained the dependency trees, which are used to isolate the descriptors stored in the document vectors. According to at least one exemplary embodiment, only modifier words are identified as descriptors, such that the document vectors do not include verbs, pronouns, determiners, etc. For example, upon creating a dependency tree for a sentence "Product X is available in Southern Montana.", block 503 determines an arc between "Southern" as a modifier of "Montana", and that "Southern" is not a modifier of "Product X". It should be apparent from the present disclosure that the dependency tree structure is advantageous over collecting all the adjectives out of the sentence at least because modifiers relevant to a given product can be isolated. More particularly, according to one or more exemplary embodiments of the present invention, the method creates a document vector column for "Product X" and adds a row for each identified descriptor thereof.

It should be understood in the present disclosure that descriptors, which are a semantic notion of at least one product, are equivalent to modifiers, which are a syntactic relation.

Referring again to block 504, the method includes accessing a sentiment dictionary or interfacing with a sentiment tagging service to add the sentiment attribute (e.g., sentiment polarity, opinion identification, etc.) for each descriptor in the vocabulary. For example, in the case of sentiment polarity, a sentiment attribute can be positive, neutral or negative. One of ordinary skill in the art would appreciate that different sentiment attributes can be used.

Referring again to block 505, the method includes populating the cells in the semantic matrix with the count (i.e., frequency) of each descriptor (e.g., terms, images, sounds) for each document or product (see for example, Semantic Matrix 1).

Referring again to block 506, the method includes filtering the descriptors in the semantic matrix to determine the X most informative descriptors in each document vector. According to an exemplary embodiment of the present invention, the descriptors are stored in the semantic matrix in rows and associated with certain columns corresponding to different products. The filtering method 506 can include applying a threshold minimum frequency to the descriptors within the semantic matrix. That is, to be included in the X descriptors, a given descriptor must appear a threshold number of times in one or more of the documents, or a given descriptor must appear a threshold number of times in the documents as a group. The filtered descriptors are used as a new representation of each document vector or product used in further processing (see FIG. 6).

According to at least one exemplary embodiment of the present invention, the filtering 506 removes less informative descriptors, leaving filtered descriptors that are most informative in the semantic matrix. According to another exemplary embodiment, a second, smaller, matrix is created that includes the most informative descriptors.

In at least one exemplary embodiment, the filtering 506 can include an additional dimensionality reduction at block 507, for example, obtained by clustering the descriptors, X, and using a centroid word of each cluster of descriptors. That is, according to at least one embodiment of the present invention, the centroid word is used in place of the other words in the same cluster.

According to at least one embodiment of the present invention, a higher-order category descriptor is determined 507 and used in place of individual descriptors (e.g., the category descriptor "easy" can encompass "quick," "few ingredients," "close to my home," etc.). That is, at block 507 the method includes finding a generalization over the space of individual descriptors, since for a large product collection the space of descriptors can become very large. Stated another way, at block 507, the method shrinks the number of individual modifiers/descriptors under consideration, to choose the ones that are available for display as the pillars in the widget. In at least one exemplary embodiment, the descriptors under consideration are reduced to descriptors that are lexically equivalent like synonyms or that have a common parent. For example, the descriptor "glamorous" is lexically equivalent to "elegant."

Figure 6:
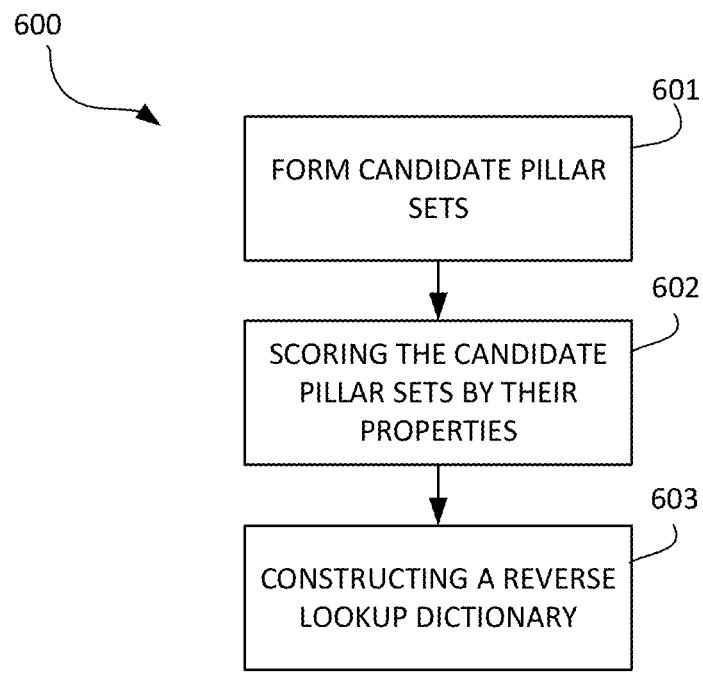
FIG. 6 depicts a method of forming a reverse-lookup dictionary for candidate pillar descriptors according to an exemplary embodiment of the present invention.

The filtering (blocks 506 and optionally 507) results in a reduced set of vocabulary descriptors to feed into a next pipeline (see FIG. 6).

Note that unlike a word cloud, or other frequency-of-terms based characterization of a corpus, the descriptors are not merely the most frequent descriptors across the corpus, but have been selected due to being resonant (e.g., relevant, impactful, etc.)(see also the description of scoring herein) for a particular product identified in the corpus and/or determined at block 502 as a named entity. The determination of descriptors at blocks 506 and (optionally) 507 for use as candidate pillars, which are used in the generation of a non-conventional semantic matrix, are more likely to represent relevant features of a given product (e.g., in a way that resonates with the end user) as compared to the most frequent descriptors across all products, at least because the descriptors are selected using indicators of informativeness, sentiment scores, etc., rather than frequency alone.

Referring to FIG. 6, taking the new presentation (i.e., filtered descriptors output from FIG. 5) as candidate pillars, a method of configuring the widget for a particular product 600 includes filtering and scoring the candidate pillars to choose a set of N pillars. The method includes generating a permutation of N pillars from the candidate pillars to form candidate pillar sets 601 and scoring the candidate pillar sets by their properties 602. These properties can include lexical, personal, and geometric properties. The method further includes constructing a reverse-lookup dictionary from positions within a geometry created by the selected pillars to associated documents and/or products 603.

Referring to block 602, according to at least one exemplary embodiment of the present invention, the candidate pillar sets can be scored by quality, resonance, coherence, distinctiveness and coverage. One of ordinary skill in the art would appreciate that one or more scorers (e.g., software modules) can be selected for a given application or implementation and that the present disclosure is not limited to the exemplary scorers described herein. According to at least one exemplary embodiment of the present invention, a scorer that accesses quality determines how good a given descriptor is for promotion of a product. According to at least one exemplary embodiment of the present invention, the quality is related to sentiment (e.g., how strongly positive is the descriptor), an affinity of the descriptor for use in advertising (examples of a descriptor with a high affinity can include "new," "proven," and "snazzy") or to a lexical ranking (for example, words with "X" or "i" scored highly as marketing words). Another example of a lexical scorer checks for word length depending on the available space in a given ad, with long words scored lower in ads with limited space.

The resonance of a descriptor with an end user of the ad widget can be considered in the case of a targeted ad. According to an exemplary embodiment of the present invention, descriptors that resonate with the end user can be selected by harvesting. According to at least one exemplary embodiment of the present invention, descriptors from the end user's own social media posts or product reviews can be highly scored as resonant. According to an exemplary embodiment, an ad is personalized by finding a feature that the end user has previously mentioned in another review (e.g., "Bluetooth doesn't work in my car") and using a keyword from the review (e.g., "Bluetooth") in the pillars to highlight that a certain attribute is available (e.g., that Bluetooth works) in a currently advertised product in the ad widget.

According to an exemplary embodiment of the present invention, the coherence of a selected descriptor depends on the geometric layout selected for two or more features of the same aspect, or in a specific example as two ends of the same aspect (e.g., "easy" and "hard" can be disposed as opposing corners of a continuum).

According to an exemplary embodiment of the present invention, the distinctiveness of a descriptor refers to how distant a given descriptor is from another descriptor, or all other descriptors, within the corpus or within the candidate pillars. According to at least one embodiment of the present invention, distinctiveness is determined using a well-known method for concept data analysis. For example, distinctiveness can be determined using a measure of term frequency-inverse document frequency (TF/IDF); TF/IDF reflects how important a word (e.g., a descriptor) is to a document in the corpus, where in a simple case TF is the number of times a word t occurs in a document d, and the inverse document frequency is a measure of how much information the word w provides based on a rate of occurrence in the corpus (i.e., across all documents). In another example, a cosine distance in vector space can be determined using the previously constructed vectors of descriptors; the cosine distance gives an angular cosine distance between vectors, with greater distances being associated with more distinctiveness.

According to an exemplary embodiment of the present invention, the determination of coverage includes scoring each tuple in terms of how many products can be arranged using the proposed pillar set. If the descriptor "bold" is associated with five products according to the inverse term-to-document lookup table (i.e., Semantic Matrix 1) constructed above, and the descriptor "spicy" applies to twenty products, then "spicy" has a higher score as an individual term. According to one or more embodiments of the present invention, the scores have a real fractional value between zero and one. In another embodiment, the scores are an integer value ranging from zero (0) to the total number of products.

Pillar sets are collections of the filtered descriptors (i.e., candidate pillars), with each of these candidate pillars having an individual score. In at least one embodiment of the present invention, a pillar set is a pair of candidate pillars. The nearness of other products in the product set can be calculated for that candidate pillar using the cosine distance, even if that product is not explicitly associated with the candidate pillar. Applying a threshold or other cutoff mechanism, the number of products that are close to the pillars can be calculated in order to select pillars that organize the most products.

According to an exemplary embodiment of the present invention, each product has a descriptor vector (e.g., comprising scores for one or more of quality, resonance, coherence, distinctiveness and coverage). According to an exemplary embodiment of the present invention, a distance can be calculated for the product to each of the candidate pillars, where the distances are used in selecting a pillar set for display in the ad widget. For example, a pillar set can be selected that best differentiates the available products. It should be understood that pillar sets can be selected based on other factors, for example, the pillar set can include a given number of candidate pillars that are most closely associated with the available products. The method further includes determining the distance between the products and the displayed pillars when associating products with the user interface control parameters, e.g., as controlled by the scrub wheel 406 shown in FIG. 4. According to at one exemplary embodiment, a product is considered to be at zero distance from each of its own descriptors, and the distance to each of the other candidate pillars can be calculated using the cosine distance between the given product's descriptor vector and each other vocabulary descriptor using a one-hot vector representation. For example in Semantic Matrix 1 above, in determining the distance between descriptor1 and product2 (D2), the one-hot vector for descriptor one appears as a vector with values <1,0,0,0>. That vector's distance to product2 is the cosine, or angle between the 2 vectors, using the standard calculation.

The one-hot vector representation is a 1×M matrix (vector) used to distinguish each descriptor in the vocabulary from every other descriptor in the vocabulary. The vector is populated with zeros in all cells with the exception of a single one bit in a cell used uniquely to identify the descriptor. It should be understood that the one-hot vector representation is a non-limiting example of matrix mathematics that can be implemented to determine a distance given a semantic matrix according to an embodiment of the present invention, and that other matrix based techniques can be used to determine the distance.

According to an exemplary embodiment of the present invention, an optimal condition is an even distribution. According to an exemplary embodiment of the present invention, an optimal condition has some small minimum distance to at least one of the pillars for each product, and approximately equal amounts of products with affinity for each pillar. In at least one exemplary embodiment, the arrangement of the descriptors in an ad is devised by arranging the descriptors into discrete buckets. In at least one exemplary embodiment, the arrangement is devised on a continuous space, such as the circle shown in FIG. 4.

According to one or more embodiments of the present invention, the minimum distance is the semantic distance between each candidate pillar descriptor and each of the products. According to one or more embodiments of the present invention, these semantic distances are translated into physical distances on the UI's layout for presentation purposes (e.g., how far one particular product is from a selected pillar). After calculating the overall distance for each candidate pillar to each product, at block 602 the method further determines, using the semantic distances, which pillar sets have an affinity for each product (e.g., by determining an affinity when the semantic distance is less than a threshold distance).

Referring to the construction of the reverse-lookup dictionary from the positions within the geometry created by the candidate pillars to associated document vectors and/or products 603, an exemplary continuum can be portrayed in a UI with a variety of implementations. In the circular arrangement shown in FIG. 4, as the user moves a scrub wheel carat marker from "EASY" to "BOLD," the product photograph featured in the center display 405 changes to show a product "very easy and not very bold" to "somewhat easy and somewhat bold" to "bold but not necessarily easy."

Referring again to FIG. 4, the widget 400 displays 4 corner positions (401-404) for four selected pillar descriptors (i.e., N=4) in a "food" domain. An image 405 at a center of the widget changes to a different product as the user manipulates the affordance. For example, using a discrete metaphor, clicking on the descriptor "BOLD" in the top right corner swaps out the image 405 displayed in the center to a carousel of products (not shown) that are semantically close to that pillar. Using a continuum metaphor, moving a scrub wheel carat marker 406 would cause the photos to flip among the products arranged in the continuum between "BOLD" and "EASY" At any point that the user clicks on the photo (or other media) they are taken to that product's details on the brand's website or in another focused format such as an application or app.

Figure 7:
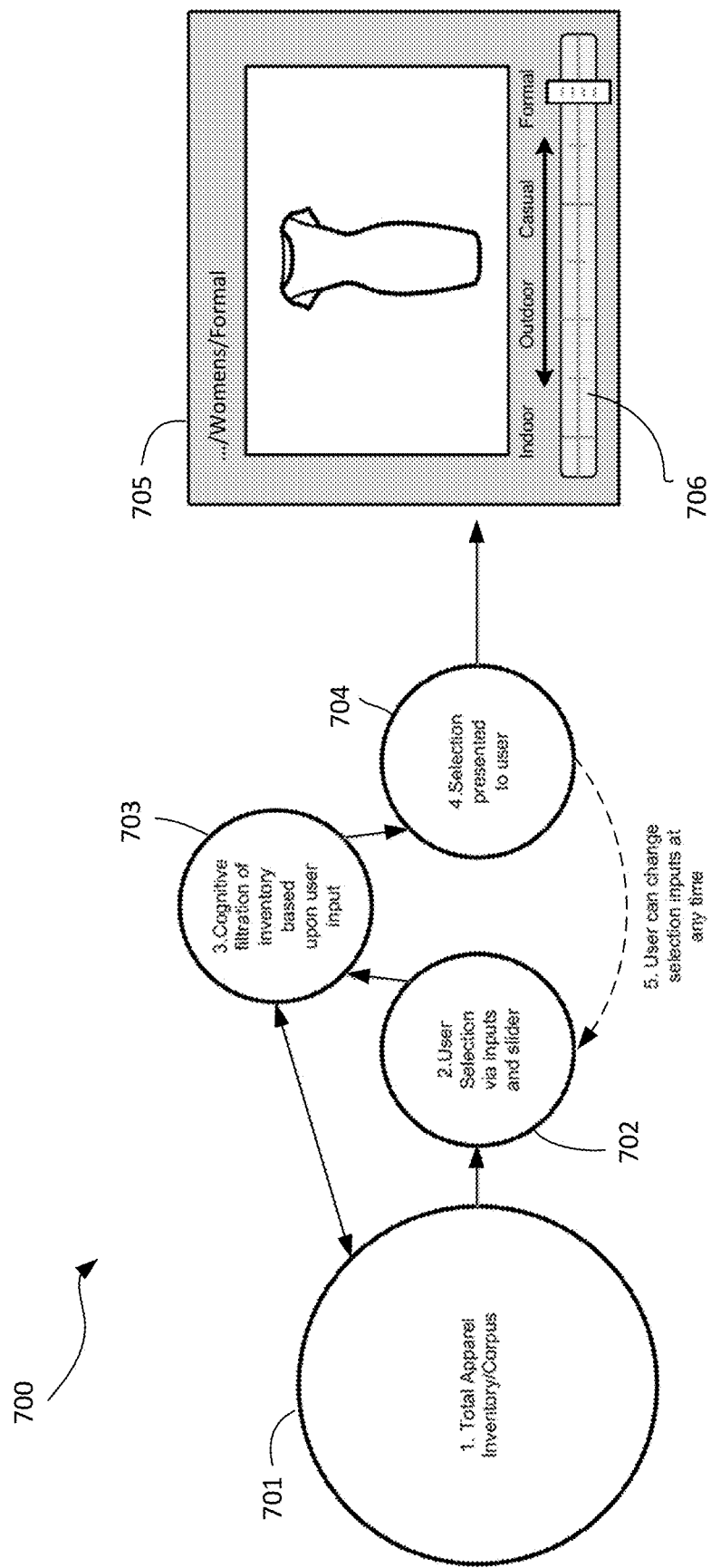
FIG. 7 depicts a method for creating a cognitive ad experience according to an exemplary embodiment of the present invention.

Recapitulation:

According to an embodiment of the present invention, a method (see FIG. 7) for creating a cognitive ad 700 comprises providing a corpus 701, receiving an input selecting a descriptor 702 (e.g., using a graphical user interface (GUI) element such as slider 706 in widget 705), filtering an inventory of available products described in the corpus 703 using the input selecting the descriptor, and presenting a product 704 in the widget 705.

Figure 8:
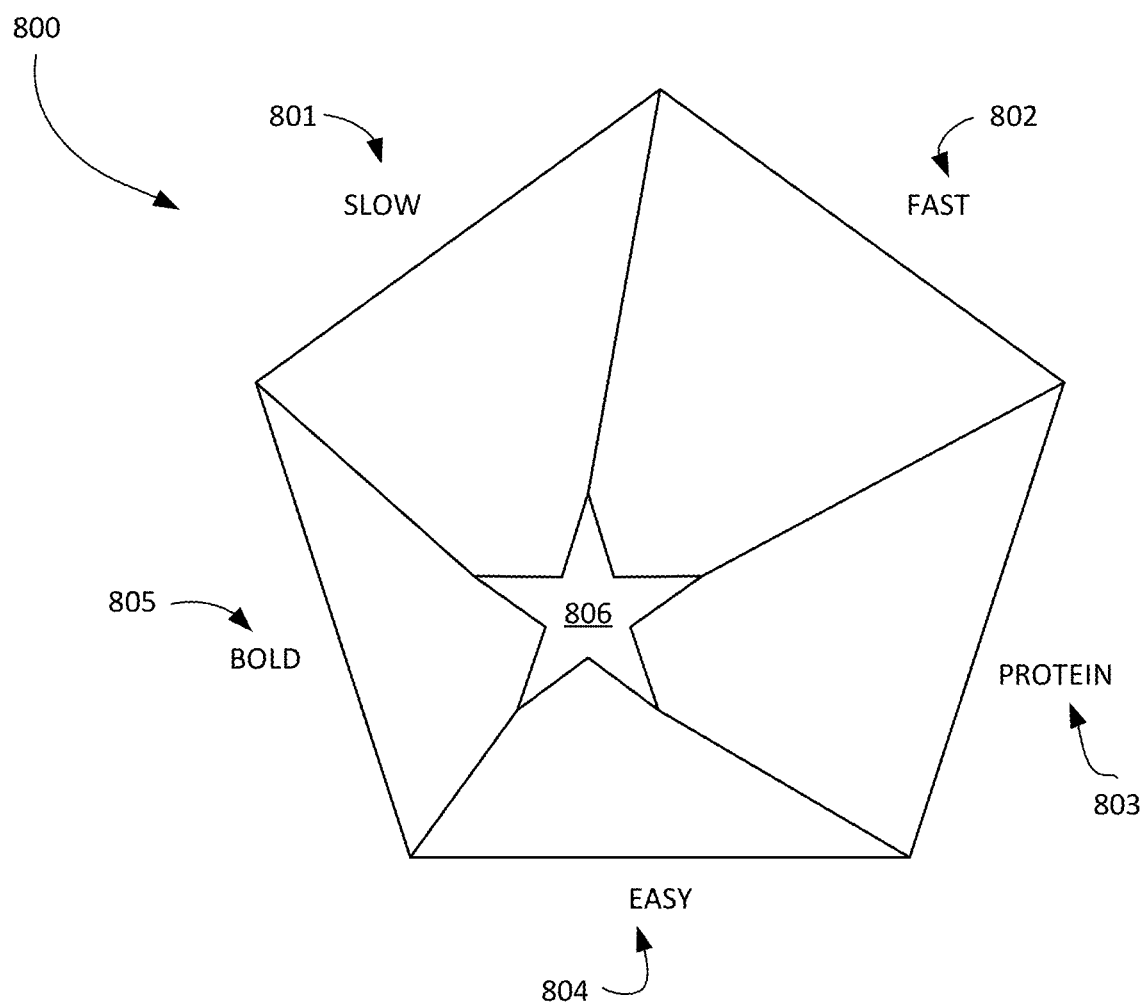
FIG. 8 depicts a selection element of a widget according to an exemplary embodiment of the present invention.

According to at least one embodiment of the present invention, the GUI element 800 (see FIG. 8) graphically presents a set of descriptive pillars 801-805 and an element 806 for selecting one or more of the descriptive pillars. As shown in FIG. 8, the element 806 for selecting the pillars enables relative selection (e.g., some relative weight among the different descriptors—0.2 slow, 0.15 fast, 0.2 protein, 0.7 easy and 0.8 bold). These weights can then be used to select a product that most closely matches the particular combination of weights according to each product's affinity to the different pillars.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for automated creation of cognitive ad experiences and a widget thereof. Further, a computer program product can include a tangible computer-readable recordable storage medium with code adapted to be executed to carry out one or more method steps described herein, including the provision of the system with the distinct software modules.

Figure 9:
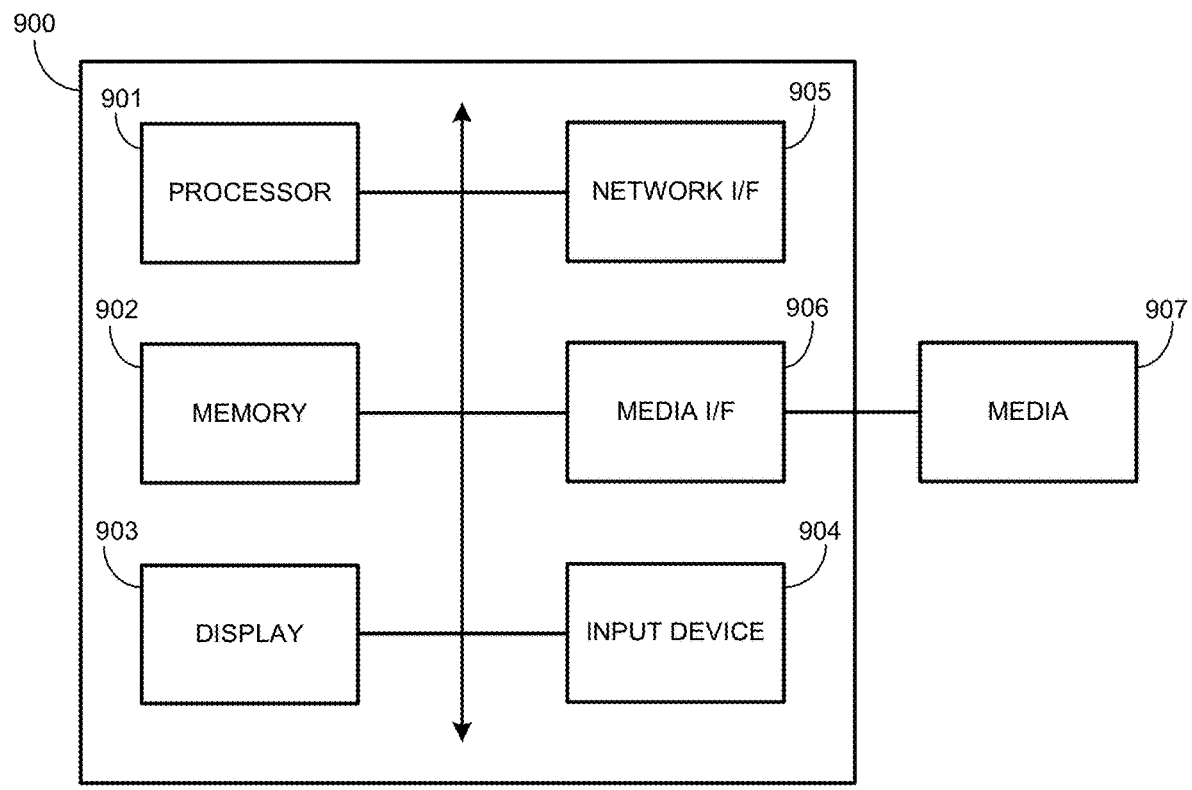
FIG. 9 is a block diagram depicting an exemplary computer system embodying a method for automated creation of cognitive ad experiences according to an exemplary embodiment of the present invention.

Referring to FIG. 9; FIG. 9 is a block diagram depicting an exemplary computer system 900 embodying the computer system for performing automated creation of cognitive ad experiences and a widget thereof. The computer system 900 shown in FIG. 9 includes a processor 901, memory 902, display 903, input device 904 (e.g., keyboard), a network interface (I/F) 905, a media I/F 906, and media 907, such as a signal source, e.g., camera, Hard Drive (HD), external memory device, etc.

In different applications, some of the components shown in FIG. 9 can be omitted. The whole system shown in FIG. 9 is controlled by computer readable instructions, which are generally stored in the media 907. The software can be downloaded from a network (not shown in the figures), stored in the media 907. Alternatively, software downloaded from a network can be loaded into the memory 902 and executed by the processor 901 to complete the function determined by the software.

The processor 901 may be configured to perform one or more methodologies described in the present disclosure, illustrative embodiments of which are shown in the above figures and described herein. Embodiments of the present invention can be implemented as a routine that is stored in memory 902 and executed by the processor 901 to process the signal from the media 907. As such, the computer system is a general-purpose computer system that becomes a specific purpose computer system when executing routines of the present disclosure.

Although the computer system described in FIG. 9 can support methods according to the present disclosure, this system is only one example of a computer system (e.g., agent system). Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method of configuring a widget running on a device and defining a graphical user interface of a cognitive advertisement, the method comprising:
   accessing a corpus comprising documents describing a plurality of products;
   parsing each of the documents within the corpus to identify the plurality of products and identify one or more modifiers for each of the plurality of products;
   creating a semantic matrix comprising a plurality of cells populated with a frequency count of each of the modifiers for each of the plurality of products, wherein the semantic matrix includes a document vector for each product of the plurality of products, and each of the document vectors is constructed from the modifiers of a respective product of the plurality of products;
   identifying, using the semantic matrix, a plurality of pillars from among the modifiers, wherein the plurality of pillars define a vector space of the plurality of products;
   constructing a reverse-lookup dictionary of semantic distances from a plurality of positions within the vector space defined by the plurality of pillars to the document vectors of the plurality of products;
   displaying the graphical user interface of the widget graphically presenting the vector space among the plurality of pillars, and a graphical user interface element configured for making a selection within the vector space corresponding to a relative selection among the plurality of pillars, wherein the semantic distances are translated into physical distances in the graphical presentation of the vector space;

receiving, via the graphical user interface element, a selection of a first position within the graphical presentation of the vector space associated with a particular combination of the plurality of pillars corresponding to the physical distances between the first position and each pillar of the plurality of pillars in the graphical user interface;

matching, using the reverse-lookup dictionary, a respective document vector of a first product of the plurality of products to the first position; and displaying, based on the matching, the first product in the widget, wherein identifying the plurality of pillars from among the modifiers comprises:

identifying a set of the modifiers in the semantic matrix appearing at least a given number of times in the corpus, wherein the set of the modifiers appearing at least the given number of times are candidate pillars;

scoring the candidate pillars based on the semantic distances to the products, wherein the semantic distances are cosine distances calculated between vectors representing the candidate pillars and the document vectors of the plurality of products; and selecting the plurality of pillars from among the candidate pillars using the scoring, wherein the plurality of pillars differentiate, based on the scoring, among the plurality of products in the vector space.

2. The computer implemented method of claim 1, wherein the parsing comprises at least one of a natural language parsing and an imaging parsing.

3. The computer implemented method of claim 1, further comprising receiving at least one constraint on the graphical user interface of the widget.

4. The computer implemented method of claim 1,
further comprising:
determining, from a sentiment dictionary, a sentiment attribute for at least one of the modifiers; and
adding the sentiment attribute to the at least one of the modifiers.

5. A non-transitory computer readable medium comprising computer executable instructions which when executed by a computer cause the computer to perform a method of configuring a widget defining a graphical user interface of a cognitive advertisement, the method comprising:

accessing a corpus comprising documents describing a plurality of products;

parsing each of the documents within the corpus to identify the plurality of products and identify one or more modifiers for each of the plurality of products;

creating a semantic matrix comprising a plurality of cells populated with a frequency count of each of the modifiers for each of the plurality of products, wherein the semantic matrix includes a document vector for each product of the plurality of products, and each of the document vectors is constructed from the modifiers of a respective product of the plurality of products;

identifying, using the semantic matrix, a plurality of pillars from among the modifiers, wherein the plurality of pillars define a vector space of the plurality of products;

constructing a reverse-lookup dictionary of semantic distances from a plurality of positions within the vector space defined by the plurality of pillars to the document vectors of the plurality of products;

displaying the graphical user interface of the widget graphically presenting the vector space among the plurality of pillars, and a graphical user interface element configured for making a selection within the vector space corresponding to a relative selection among the plurality of pillars, wherein the semantic distances are translated into physical distances in the graphical presentation of the vector space;

receiving, via the graphical user interface element, a selection of a first position within the graphical presentation of the vector space associated with a particular combination of the plurality of pillars corresponding to the physical distances between the first position and each pillar of the plurality of pillars in the graphical user interface;

matching, using the reverse-lookup dictionary, a respective document vector of a first product of the plurality of products to the first position; and displaying, based on the matching, the first product in the widget, wherein identifying the plurality of pillars from among the modifiers comprises:

identifying a set of the modifiers in the semantic matrix appearing at least a given number of times in the corpus, wherein the set of the modifiers appearing at least the given number of times are candidate pillars;

scoring the candidate pillars based on the semantic distances to the products, wherein the semantic distances are cosine distances calculated between vectors representing the candidate pillars and the document vectors of the plurality of products;

selecting the plurality of pillars from among the candidate pillars using the scoring, wherein the plurality of pillars differentiate, based on the scoring, among the plurality of products in the vector space.

6. The computer readable medium of claim 5, wherein the parsing comprises at least one of a natural language parsing and an imaging parsing.

7. The computer readable medium of claim 5, further comprising receiving at least one constraint on the graphical user interface of the widget.

8. The computer readable medium of claim 5,
further comprising:
determining, from a sentiment dictionary, a sentiment attribute for at least one of the modifiers; and
adding the sentiment attribute to the at least one of the modifiers.

* * * * *